(12) United States Patent  
Levine

(10) Patent No.: US 10,809,762 B1
(45) Date of Patent: Oct. 20, 2020

(54) ACCESSORY DISPLAY DEVICE

(71) Applicant: Alex Cole Levine, Austin, TX (US)

(72) Inventor: Alex Cole Levine, Austin, TX (US)

( * ) Notice: Subject to any disclaimer, the term of this patent is extended or adjusted under 35 U.S.C. 154(b) by 0 days.

(21) Appl. No.: 16/673,920

(22) Filed: Nov. 4, 2019

(51) Int. Cl.
*G06F 1/16* (2006.01)

(52) U.S. Cl.
CPC .......... *G06F 1/1607* (2013.01); *G06F 1/1616* (2013.01); *G06F 1/1632* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,302,612 B1 * | 10/2001 | Fowler | ................... | F16C 11/06 16/224 |
| 6,532,146 B1 * | 3/2003 | Duquette | .............. | G06F 1/1607 361/679.04 |
| 6,643,124 B1 * | 11/2003 | Wilk | ..................... | G06F 1/1616 312/223.1 |
| 6,667,877 B2 * | 12/2003 | Duquette | .............. | G06F 1/1607 248/917 |
| 6,859,219 B1 * | 2/2005 | Sall | ....................... | G06F 1/1607 345/1.1 |
| 6,967,632 B1 * | 11/2005 | Minami | ................. | F16M 11/08 345/1.3 |
| 7,283,353 B1 * | 10/2007 | Jordan | .................. | G06F 1/1601 248/122.1 |
| 7,375,954 B2 * | 5/2008 | Yang | ..................... | G06F 1/1616 248/920 |
| 7,633,744 B2 * | 12/2009 | Kuhn | .................... | G06F 1/1622 361/679.04 |
| 7,752,789 B2 * | 7/2010 | Sun | ........................ | G06F 1/1601 108/70 |
| 7,813,118 B2 * | 10/2010 | Burge | .................. | F16M 11/105 361/679.21 |
| D630,204 S * | 1/2011 | Kovac | .......................... | D14/327 |
| D630,205 S * | 1/2011 | Kovac | .......................... | D14/327 |
| D630,206 S * | 1/2011 | Kovac | .......................... | D14/327 |
| D630,628 S * | 1/2011 | Kovac | .......................... | D14/327 |
| 7,936,558 B2 * | 5/2011 | Chang | ................... | G06F 1/1647 361/679.04 |
| 8,018,715 B2 * | 9/2011 | Chang | ................... | G06F 1/1616 361/679.04 |
| 8,317,146 B2 * | 11/2012 | Jung | ..................... | G06F 1/1601 248/125.7 |

(Continued)

*Primary Examiner* — Lisa Lea-Edmonds

(57) ABSTRACT

An accessory display device for a display device, such as for a computer, is described. The device includes a housing having a first side and a second side movable relative to one another and a first pair of rails coupled to the first side and a second pair of rails coupled to the second side, the first pair of rails engaged with and slidable relative to the second pair of rails. The device also includes a tensioning member coupled to the first side and the second side and placing tension between the first side and second side. Further, the device includes a first engagement portion coupled to the first side and a second engagement portion coupled to the second side. The first engagement portion and the second engagement portion are configured to engage the side of a computer's display under force created by the tensioning member. Further still, a first display is slidable within the housing and is movable from a stowed position to a use position.

20 Claims, 6 Drawing Sheets

(56) References Cited

U.S. PATENT DOCUMENTS

| | | | | |
|---|---|---|---|---|
| 9,441,782 B2* | 9/2016 | Funk | ............... | F16M 13/02 |
| 9,568,952 B2* | 2/2017 | Matzke | ............... | G06F 1/1649 |
| 9,696,760 B1* | 7/2017 | Zhang | ............... | G06F 1/1652 |
| 10,082,832 B1* | 9/2018 | Wang | ............... | G06F 1/1641 |
| 2005/0237699 A1* | 10/2005 | Carroll | ............... | G06F 1/1679 |
| | | | | 361/600 |
| 2005/0253775 A1* | 11/2005 | Stewart | ............... | G06F 1/1616 |
| | | | | 345/1.1 |
| 2006/0082518 A1* | 4/2006 | Ram | ............... | G06F 3/1446 |
| | | | | 345/1.1 |
| 2008/0198096 A1* | 8/2008 | Jung | ............... | G09G 3/20 |
| | | | | 345/1.3 |
| 2009/0102744 A1* | 4/2009 | Ram | ............... | G06F 1/1624 |
| | | | | 345/1.1 |
| 2012/0223872 A1* | 9/2012 | Ram | ............... | H04M 1/0266 |
| | | | | 345/1.3 |
| 2015/0212546 A1* | 7/2015 | Ram | ............... | G06F 1/1649 |
| | | | | 361/679.01 |
| 2015/0378393 A1* | 12/2015 | Erad | ............... | G06F 1/1647 |
| | | | | 345/1.3 |
| 2016/0154434 A1* | 6/2016 | Lakhani | ............... | G06F 1/1628 |
| | | | | 361/679.27 |
| 2017/0003712 A1* | 1/2017 | Funk | ............... | F16M 13/00 |

\* cited by examiner

ACCESSORY DISPLAY DEVICE

BACKGROUND

Laptop computers have been a huge benefit for people who like to have the ability of a personal computer wherever they are. Whether it be for work, study, or entertainment, the portability of laptop computers has been very advantageous. However, the tradeoff for laptop computers portability has always been the size of the display screen. The bigger the display, the bigger the laptop computer and the less portable it becomes. Therefore, there is a need for a device which allows for the laptop computer display to be expanded. There is also a need for a device that allows for the laptop computer display to be expanded and may be added onto the laptop computer easily and is also compact and portable.

SUMMARY

An example embodiment relates to an accessory display device for a computer. The device includes a housing having a first side and a second side movable relative to one another and a first pair of rails coupled to the first side and a second pair of rails coupled to the second side, the first pair of rails engaged with and slidable relative to the second pair of rails. The device also includes a tensioning member coupled to the first side and the second side and placing tension between the first side and second side. Further, the device includes a first engagement portion coupled to the first side and a second engagement portion coupled to the second side. The first engagement portion and the second engagement portion are configured to engage the side of a computer's display under force created by the tensioning member. Further still, a first display is slidable within the housing and is movable from a stowed position to a use position.

Another example embodiment relates to an accessory display device for a computer. The device includes a housing having a first side and a second side in sliding engagement with each other and slidable relative to one another. The device also includes a tensioning member coupled to the first side and the second side and placing tension between the first side and second side and a first engagement portion coupled to the first side and a second engagement portion coupled to the second side, the first engagement portion and the second engagement portion configured to engage at least a portion of the side of a computer's display under force created by the tensioning member and to engage at least a portion of the top of the display to further keep the housing engaged with the computer's display. Further, the device includes a first display slidable within the housing and movable from a stowed position to a use position.

Yet another example embodiment relates to an accessory display device for a computer. The device includes a means for housing at least one slidable display screen, the means for housing having a first side and a second side in sliding engagement with each other and slidable relative to one another and a means for tensioning the first side and the second side and thereby placing tension between the first side and second side. The device also includes a first means for engaging the side of a computer's display, associated with the first side. Further, the device includes a second means for engaging the side of a computer's display, whereby the tensioning means provides forces to the first means for engaging and the second means for engaging; Still further, the device includes a first display means that is slidable within the means for housing and movable from a stowed position to a use position.

In addition to the foregoing, other aspects are described in the claims, drawings, and text forming a part of the disclosure set forth herein. The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the disclosures set forth herein.

BRIEF DESCRIPTION OF THE DRAWINGS

The use of the same symbols in different drawings typically indicates similar or identical items unless context dictates otherwise.

DETAILED DESCRIPTION

Figure 1:
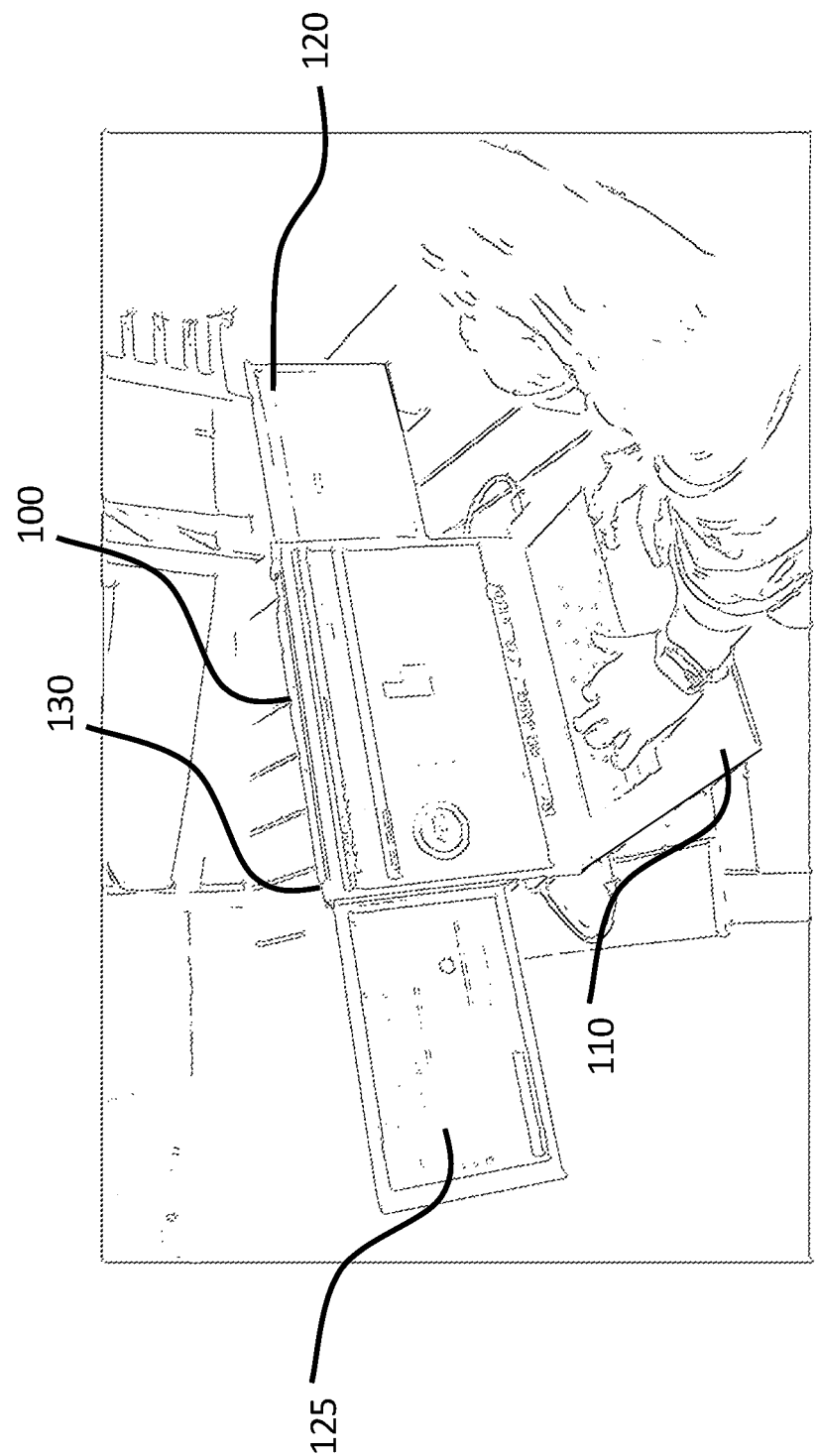
FIG. 1 is a depiction of an accessory display device for a laptop computer in accordance with an example embodiment.

Referring to FIG. 1, a computer display accessory 100 is depicted coupled to a laptop computer 110. Computer display accessory 100 is not limited to laptop computers but may be used on any type of display device including but not limited to tablets, e-readers, gaming devices, desktop displays, television displays, etc. Therefore, computer display accessory 100 is not limited to computers and in fact may be utilized on any type of display. Display accessory 100 adds two additional screens 120 and 125 to any existing display. Display accessory 100 expands the screen display real estate with two slidable screens that pull out from the back edges of a housing 130. Housing 130 itself is universal, fitting laptops of all sizes and uses tension from elastic to tighten around the edges of the laptop screen.

Figure 2:
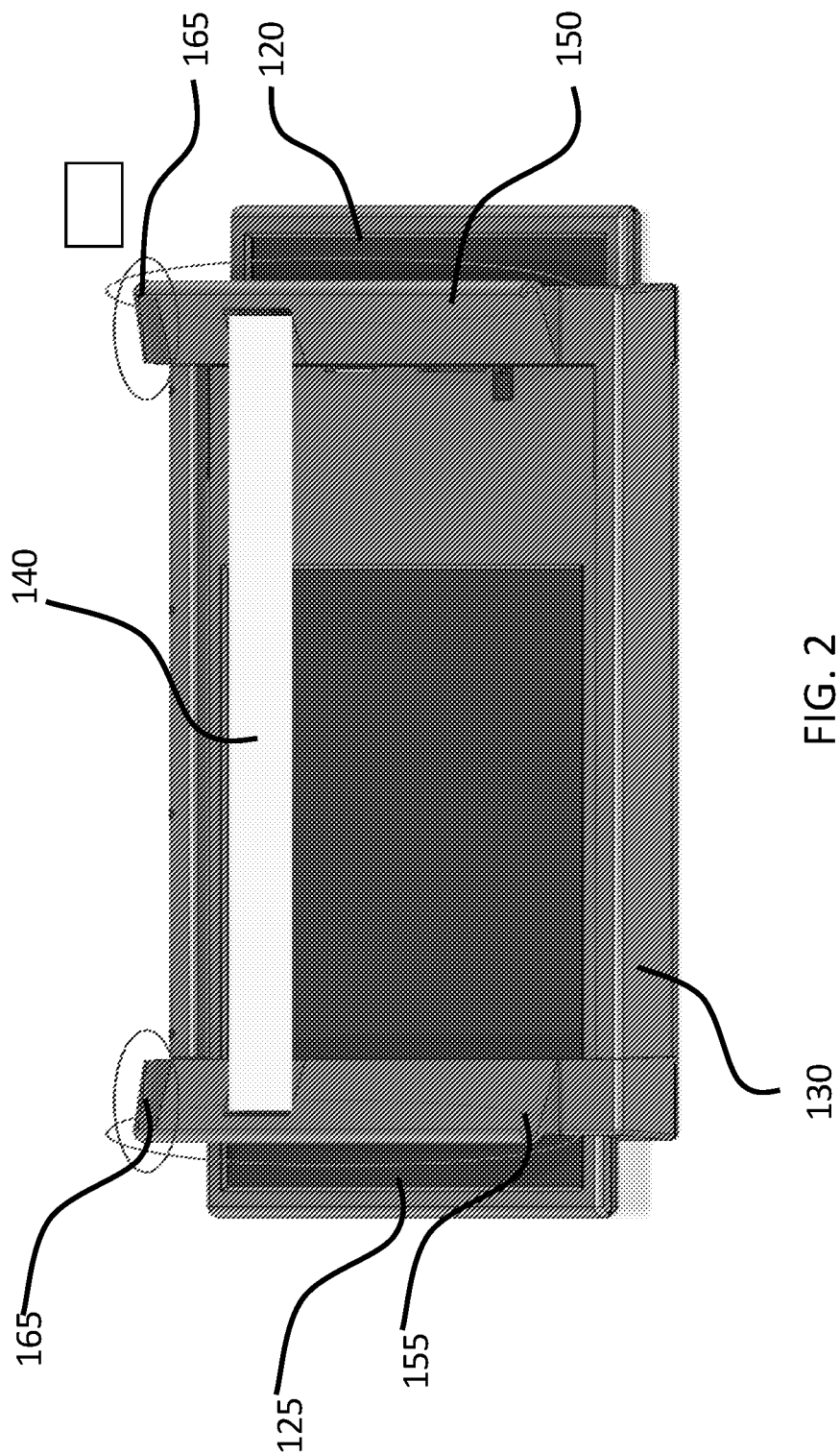
FIG. 2 is an example embodiment of the accessory display device of FIG. 1 removed from the laptop computer.

Referring to FIG. 2, housing 130 includes a mechanism that allows the screens to engage with the lid of the computer display accessory 110 and to pull out from either side. Housing 130 uses an elastic band 140 or other tensioning member to create tension between a right frame clip 150 and a left frame clip 155 which creates force when pulled apart to put on the lid, effectively clamping either side to the computer lid. There is also a lip 160 on the top of right frame clip 155 and a lip 165 on the top of left frame clip 155. The lip helps to further secure display accessory 100 on the top of computer 110 display and helps further secure computer display accessory 100 to computer 110. When a user pulls apart the left and right sides of housing 130, an increasing tension is created in the elastic band forcing either side back towards each other. This is what creates the "clamping" effect of the right frame clip 150 and the left frame clip 155.

In accordance with an example embodiment, elastic band 140 may be replaced with any type of suitable tensioning member, including but not limited to a spring, a rubber band, resilient plastic portions, etc. These tensioning members may be coupled to housing portions 170 and 175 in any of a variety of ways including but not limited to with glue, by melting, by tying or sewing, by clipping, etc. In one example, the band 140 may be threaded through a cutout on each portion of housing 130. Once threaded through the cutout, a blocking piece which does not fit through the cutout is affixed to the band so the band does not slip back through the cutout and maintains tension on the band. Any of a variety of ways may be used to attach the tensioning member to the two housing portions without departing from the scope of the invention.

Figure 3:
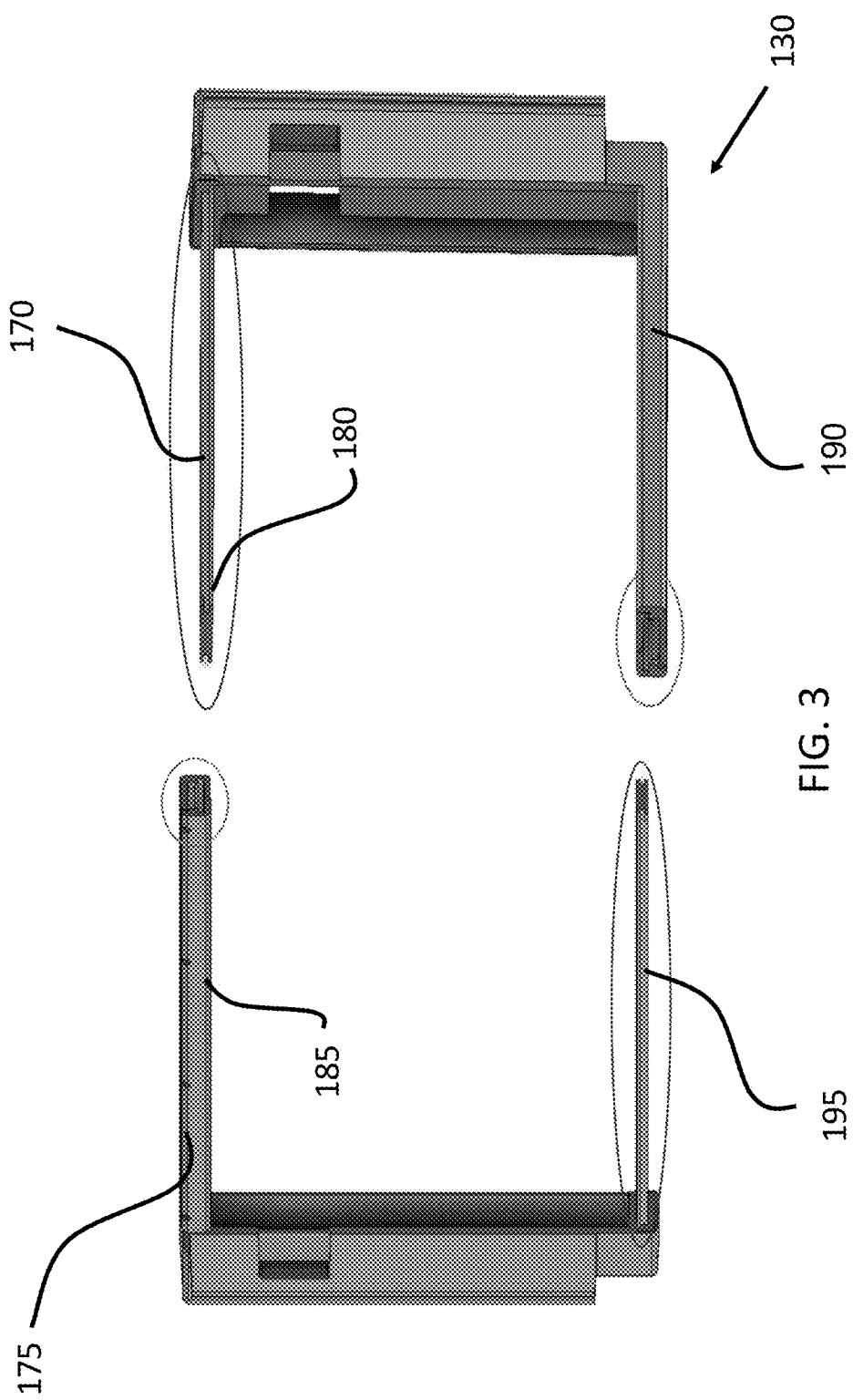
FIG. 3 is an example embodiment of the housing accessory display device of FIG. 1 in an exploded view.
Figure 5:
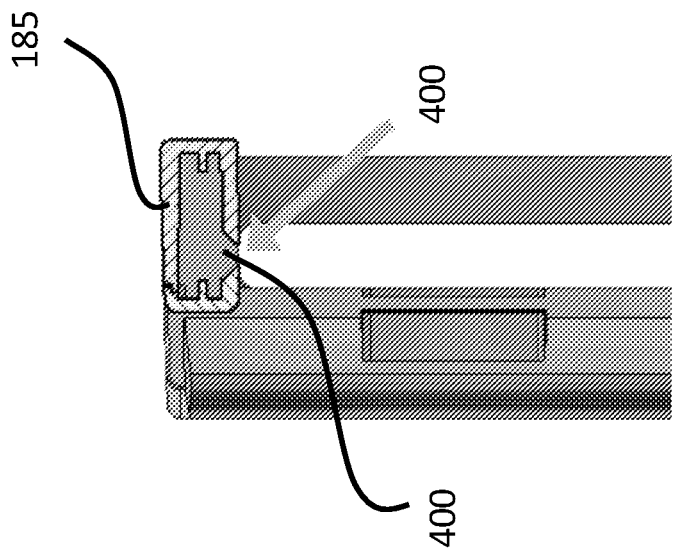
FIG. 5 is an example cross-sectional view of the female rail of FIG. 4.

Referring now to FIG. 3, the main part of housing 130 is shown as an exploded view of the two primary portions, right portion 170 and left portion 175. Right portion 170 includes an upper rail 180 and a lower rail 190. Likewise, left portion 175 includes an upper rail 185 and a lower rail 195. Upper rail 185 comprises a hollow female rail while upper rail 180 acts as a male rail complementary to rail 185 and slidable within rail 185. Lower rail 190 comprises a hollow female rail while lower rail 195 acts as a male rail complimentary to rail 190 and slidable within rail 190. This design allows for housing 130 to be expandable to clamp onto virtually any size and type of display housing.

Once housing 130 is affixed to a computer or other display, a user may pull either or both of two display screens 120 and 125 from a stowed position to a use position as depicted in FIG. 1.

Figure 4:
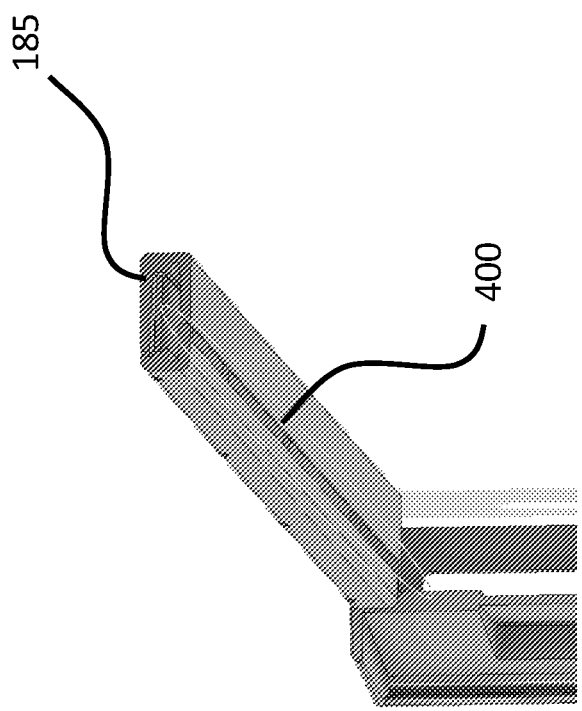
FIG. 4 is an example embodiment of a female rail of the housing.
Figures 6, 7:
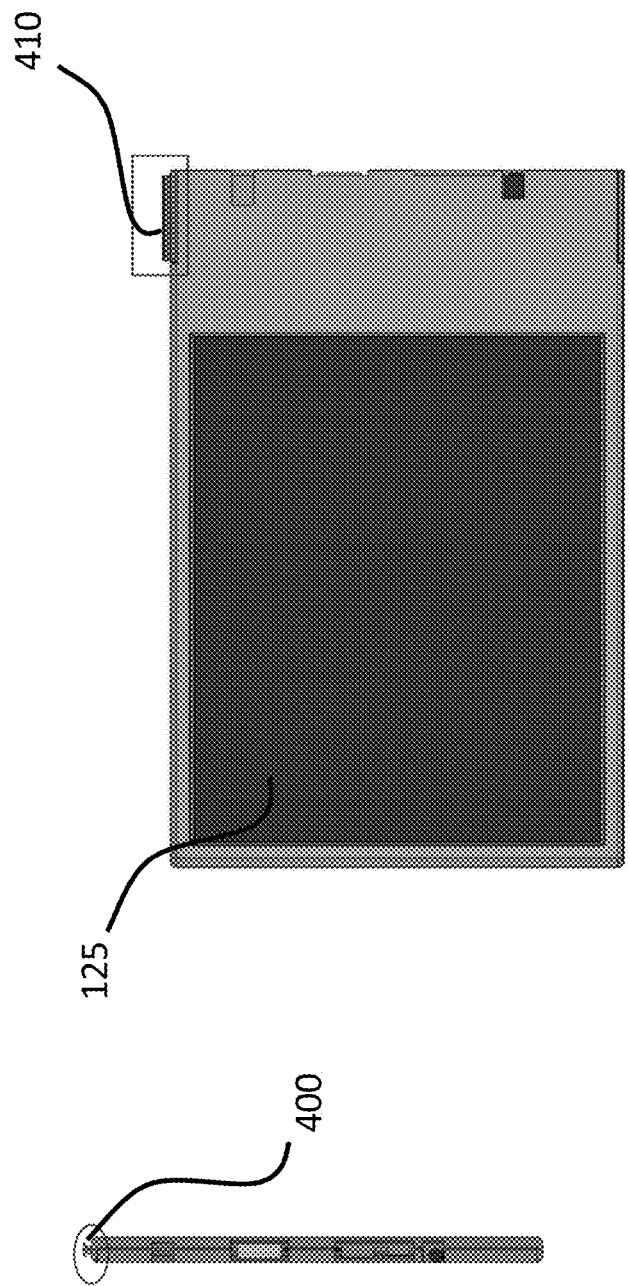
FIG. 6 is an example embodiment of a side view of a display showing a rail guide.
FIG. 7 is an example embodiment of a front view of the display of FIG. 6 showing a rail guide.

Referring now to FIG. 4, a triangular notch on the female sides of upper rail 185 and also lower rail 190 which are both the female rails, act to engage a triangular guiding slide 410 as depicted in FIG. 6 and FIG. 7 for display 125. Likewise, a triangular guiding slide is on the bottom edge of display 120. The cross-sectional view depicted in FIG. 6 shows how the triangular guiding slide 410 interfaces with the triangular notch 400.

Triangular guiding slide 400 also serves as a stopper to prevent the screen from falling out of rail 185 as display 125 is extended. Triangular guiding slide 400 also acts as a stopper on the other end of female rail 185 so that display 125 doesn't fall out the rail internally when display 125 is stowed.

Figure 8:
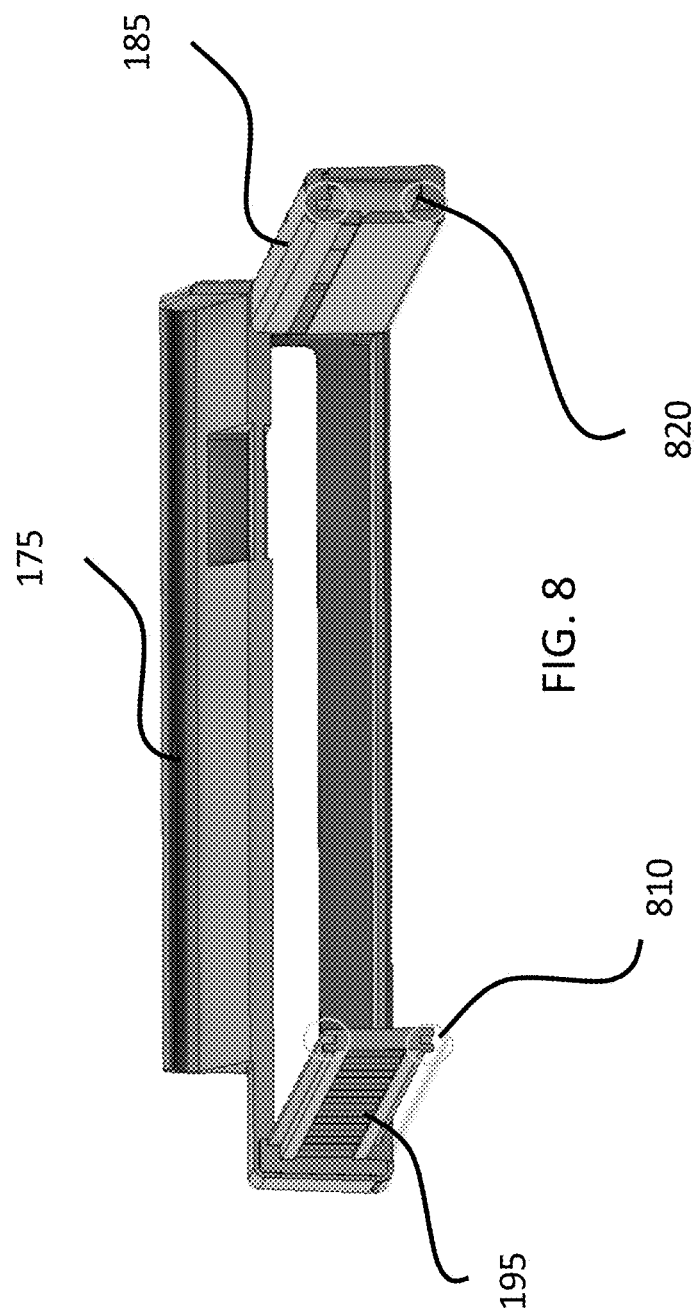
FIG. 8 is an example embodiment of a perspective end view of the left side housing poi non.

Referring now to FIG. 8, an end view of the rails 185 and 195 of the left portion 175 of the housing 130 is depicted. Male rail 195 includes two guides that run along the length of rail 810. Guides 810 engage with female rail 190 which has a female cross-section similar to the female cross-section of rail 185. Rail 185 is depicted with a pair of opposing notches 820 that run along rail 185 and are configured to engage guides on male rail 180 like guides 810 of rail 195. The use of a combination of guides and complementary notches on rails 185 and 180 and similarly rails 195 and 190 allows for accurate sliding engagement of the two portions 170 and 175 of housing 130. The rail to rail engagement depicted is one example of an arrangement to enable expandability of housing 130 however any of a variety of other ways may be used without departing from the scope of the invention.

It should be noted that the device described may be formed of a number of different materials and formed in a variety of shapes without departing from the scope of the invention. Also, it should be noted that embodiments of the accessory device are designed to couple to the display device, such as but not limited to a laptop computer display, in a manner that is secure enough to carry the laptop computer with the accessory device attached thereto. In this way the portability of a device, such as a laptop computer is not compromised.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. An accessory display device for a display device, comprising:
   a housing having a first side and a second side movable relative to one another;
   a first pair of rails coupled to the first side and a second pair of rails coupled to the second side, the first pair of rails engaged with and slidable relative to the second pair of rails;
   a tensioning member coupled to the first side and the second side and placing tension between the first side and second side;
   a first engagement portion coupled to the first side and a second engagement portion coupled to the second side, the first engagement portion and the second engagement portion configured to engage the side of a display device under force created by the tensioning member; and
   a first, display slidable within the housing and movable from a stowed position to a use position.

2. The accessory display device of claim 1, wherein the housing is configured to support at least one display slidable within the housing.

3. The accessory display device of claim 1, wherein the housing is configured to support two displays slidable within the housing.

4. The accessory display device of claim 1, wherein the housing is configured to support at least one display slidable in a guide of at least one rail.

5. The accessory display device of claim 1, wherein at least one of the first pair of rails is a female rail and the other of the first pair of rails is a male rail.

6. The accessory display device of claim 1, wherein at least one of the first pair of rails is a female rail and the other of the first pair of rails is a male rail and at least one of the second pair of rails is a male rail and the other of the second pair of rails is a female rail, wherein the female rail of the first pair of rails engages with the male rail of the second pair of rails and the female rail of the second pair of rails engages with the male rail of the first pair of rails.

7. The accessory display device of claim 1, wherein the tensioning member comprises an elastic band.

8. The accessory display device of claim 1, wherein the tensioning member comprises a spring.

9. An accessory display device for a computer, comprising:
   a housing having a first side and a second side in sliding engagement with each other and slidable relative to one another;
   a tensioning member coupled to the first side and the second side and placing tension between the first side and second side;
   a first engagement portion coupled to the first side and a second engagement portion coupled to the second side, the first engagement portion and the second engagement portion configured to engage at least a portion of the side of a computer's display under force created by the tensioning member and to engage at least a portion of the top of the display to further keep the housing engaged with the computer's display; and
   a first display slidable within the housing and movable from a stowed position to a use position.

10. The accessory display device of claim 9, wherein the housing is configured to support at least one display slidable within the housing.

11. The accessory display device of claim 9, wherein the housing is configured to support two displays slidable within the housing.

12. The accessory display device of claim 9, wherein the housing is configured to support at least one display slidable along a guide rail of the first or second side.

13. The accessory display device of claim 9, wherein the housing is configured to support a first display slidable along a guide rail of the first or second side and is configured to support a second display slidable along a guide rail of the other of the first or second side.

14. The accessory display device of claim 9, wherein the tensioning member comprises an elastic band.

15. The accessory display device of claim 9, wherein the tensioning member comprises a spring.

16. An accessory display device for a computer, comprising:
   a means for housing at least one slidable display screen, the means for housing having a first side and a second side in sliding engagement with each other and slidable relative to one another;
   a means for tensioning the first side and the second side and thereby placing tension between the first side and second side;
   a first means for engaging the side of a computer's display, associated with the first side;
   a second means for engaging the side of a computer's display, whereby the tensioning means provides forces to the first means for engaging and the second means for engaging; and
   a first display means is slidable within the means for housing and movable from a stowed position to a use position.

17. The accessory display device of claim 16, further comprising:
   a second display means is slidable within the means for housing and movable from a stowed position to a use position.

18. The accessory display device of claim 16, wherein the tensioning means comprises an elastic band.

19. The accessory display device of claim 16, wherein the tensioning means comprises a spring.

20. The accessory display device of claim 16, further comprising:
   at least one guiding means for guiding at least the first display means to slide along.

* * * * *